United States Patent
Haas et al.

(10) Patent No.: US 8,821,083 B2
(45) Date of Patent: Sep. 2, 2014

(54) MACHINE TOOL INCLUDING A PLURALITY OF TOOL SPINDLES AND A FRAME SHAPED RACK

(75) Inventors: Roland Haas, St. Georgen/Gusen (AT); Klaus Dirnberger, Enns (AT)

(73) Assignee: Anger Machining GmbH, Traun (AT)

( * ) Notice: Subject to any disclaimer, the term of this patent is extended or adjusted under 35 U.S.C. 154(b) by 376 days.

(21) Appl. No.: 12/737,589

(22) PCT Filed: Jul. 24, 2009

(86) PCT No.: PCT/AT2009/000288
§ 371 (c)(1),
(2), (4) Date: Jan. 28, 2011

(87) PCT Pub. No.: WO2010/012017
PCT Pub. Date: Feb. 4, 2010

(65) Prior Publication Data
US 2011/0131791 A1   Jun. 9, 2011

(30) Foreign Application Priority Data
Jul. 30, 2008  (AT) ................. GM413/2008

(51) Int. Cl.
*B23C 1/08*   (2006.01)
(52) U.S. Cl.
USPC ............ 409/212; 409/202; 409/213; 483/48; 483/49; 483/66
(58) Field of Classification Search
CPC .............. B23C 1/002; B23C 1/08; B23C 1/14
USPC ......... 409/202, 212, 235, 192, 203, 213, 217, 409/165, 168; 483/36, 38, 39, 40, 41, 48, 483/49, 44, 67, 66, 68; 408/53
See application file for complete search history.

(56) References Cited

U.S. PATENT DOCUMENTS

| | | | | |
|---|---|---|---|---|
| 1,556,852 A | * | 10/1925 | La Ducer | 409/212 |
| 2,892,388 A | * | 6/1959 | Daugherty | 409/202 |
| 2,940,366 A | * | 6/1960 | Daugherty | 409/212 |

(Continued)

FOREIGN PATENT DOCUMENTS

| | | | | |
|---|---|---|---|---|
| CA | 1158084 A1 | * | 12/1983 | ............. B23C 1/002 |
| CH | 685 609 | | 8/1995 | |

(Continued)

OTHER PUBLICATIONS
International Search Report.

*Primary Examiner* — David Bryant
*Assistant Examiner* — Jason L Vaughan
(74) *Attorney, Agent, or Firm* — Collard & Roe, P.C.

(57) ABSTRACT

The invention relates to a machine tool (1), comprising a plurality of fixed tool spindles (3) and such that can optionally be displaced from a retracted idle position to an extended working position and can be positioned at different positions in a frame-like rack (2), and a workpiece carrier (4) with at least one workpiece holder (5), with the workpiece (4) carrier being movable at least in several axes in a translational manner and preferably also in a rotational manner. In order to provide advantageous constructional conditions it is proposed that at least one of the tool spindles (3) is associated with a tool magazine (7) plus tool changer (8).

8 Claims, 4 Drawing Sheets

(56) References Cited

U.S. PATENT DOCUMENTS

| | | | | |
|---|---|---|---|---|
| 3,413,893 A * | 12/1968 | Wilson | 409/217 |
| 3,552,264 A * | 1/1971 | Meinke | 409/212 |
| 4,227,296 A * | 10/1980 | Wittenbreder | 483/46 |
| 4,945,958 A * | 8/1990 | Shoda | 144/1.1 |
| 4,987,668 A * | 1/1991 | Roesch | 483/30 |
| 5,100,270 A * | 3/1992 | Dowdle et al. | 409/132 |
| 5,230,685 A * | 7/1993 | Christen et al. | 483/55 |
| 5,265,986 A * | 11/1993 | Prokopp | 408/3 |
| 5,452,502 A | 9/1995 | Walter et al. | |
| 5,486,151 A | 1/1996 | Bergmann et al. | |
| 5,970,599 A * | 10/1999 | Garnett et al. | 29/563 |
| 6,203,478 B1 * | 3/2001 | Gorrochategui | 483/31 |
| 6,394,892 B2 * | 5/2002 | Hanisch et al. | 451/259 |
| 6,557,235 B1 * | 5/2003 | Katz et al. | 29/563 |
| 6,666,632 B1 * | 12/2003 | Fioroni | 409/192 |
| 6,865,788 B2 * | 3/2005 | Pasquetto | 29/38 B |
| 6,880,695 B2 * | 4/2005 | Suzuki et al. | 198/832.1 |
| 6,904,665 B2 * | 6/2005 | Walz | 29/563 |
| 7,179,030 B2 * | 2/2007 | Krosta et al. | 409/235 |
| 7,318,693 B2 * | 1/2008 | Hansch et al. | 409/235 |
| 7,361,129 B2 * | 4/2008 | Yang | 483/42 |
| 2002/0107122 A1 * | 8/2002 | Hoppe | 483/46 |
| 2003/0115736 A1 * | 6/2003 | Kurz et al. | 29/558 |
| 2004/0029691 A1 | 2/2004 | Maeda | |
| 2005/0085359 A1 | 4/2005 | Stave et al. | |
| 2005/0239620 A1 * | 10/2005 | Lutz et al. | 483/63 |
| 2008/0188363 A1 | 8/2008 | Baumbusch et al. | |

FOREIGN PATENT DOCUMENTS

| | | | | |
|---|---|---|---|---|
| DE | 2405163 A * | 8/1975 | | |
| DE | 2405163 A1 * | 8/1975 | | B23C 1/002 |
| DE | 2458770 A1 * | 6/1976 | | B23C 1/08 |
| DE | 2739534 A1 * | 3/1979 | | B23C 1/002 |
| DE | 2844088 A1 * | 5/1980 | | B23C 1/08 |
| DE | 2853338 A1 * | 5/1980 | | B23C 1/08 |
| DE | 43 01 393 | 7/1994 | | |
| DE | 101 19 175 | 10/2002 | | |
| DE | 101 19 175 A1 | 10/2002 | | |
| DE | 203 07 905 | 4/2004 | | |
| DE | 102004022598 A1 * | 12/2004 | | B27C 9/04 |
| DE | 10 2004 050 199 | 4/2006 | | |
| DE | 10 2007 022 200 | 11/2007 | | |
| DE | 102012108512 A1 * | 7/2013 | | B23C 1/08 |
| EP | 1 500 465 A2 | 1/2005 | | |
| EP | 1 642 673 B2 | 4/2006 | | |
| FR | 2473925 A1 * | 7/1981 | | B23C 1/002 |
| FR | 2484881 A1 * | 12/1981 | | B23C 1/002 |
| FR | 2509643 A1 * | 1/1983 | | B23C 1/00 |
| GB | 2014882 A * | 9/1979 | | B23C 1/002 |
| GB | 2271945 A * | 5/1994 | | |
| JP | 59047136 A * | 3/1984 | | B23Q 3/157 |
| JP | 61076244 A * | 4/1986 | | B23Q 3/157 |
| JP | 01159151 A * | 6/1989 | | |
| WO | WO 93/05926 | 4/1993 | | |
| WO | WO 97/10932 | 3/1997 | | |

* cited by examiner

MACHINE TOOL INCLUDING A PLURALITY OF TOOL SPINDLES AND A FRAME SHAPED RACK

CROSS REFERENCE TO RELATED APPLICATIONS

This application is the National Stage of PCT/AT2009/000288 filed on Jul. 24, 2009, which claims priority under 35 U.S.C. §119 of Austrian Application No. GM 413/2008 filed on Jul. 30, 2008, the disclosure of which is incorporated by reference. The international application under PCT article 21(2) was not published in English.

FIELD OF THE INVENTION

The invention relates to a machine tool, comprising a plurality of fixed tool spindles and such that can optionally be displaced from a retracted idle position to an extended working position and can be positioned at different positions in a frame-like rack, and a workpiece carrier with at least one workpiece holder, with the workpiece carrier being movable at least in several axes in a translational manner and preferably also in a rotational manner.

DESCRIPTION OF THE PRIOR ART

Such known machine tools (WO 97/10932 A) are used to fix the workpiece to be machined to the workpiece holder of the workpiece carrier and to supply the same together with the workpiece carrier successively to individual machining tools such as drills, milling cutters, grinders or the like. The machining tools are arranged on spindles fastened in a stationary manner on the frame of the rack, with the spindles being displaceable in an alternating manner between an extended working position and a retracted idle position in order to prevent mutual obstructions of the spindles during the machining by spindles that are in the idle position at that time. These known machine tools are especially characterized by their economical operation, which is obtained especially in such a way that it is not necessary to wait for any tool changing times and idle times during a machining process because the machine tool accommodates the required tools in the different spindles and the tools thus need not be changed between the individual machining processes and can be started up already before the positioning of the workpiece from one spindle to the next. As a result of these measures, non-productive times are minimized and rapid machining of the workpieces is enabled. Moreover, multi-spindle parallel machining of several workpieces is possible in such apparatuses.

The workpiece is usually movable in a translational manner in three axes with the workpiece carrier on a carriage, and is further rotatable about at least one rotational axis, in order to guide the workpiece in the desired manner with respect to the individual fixed machining tools and to also enable the milling, drilling or grinding of complex paths. It is a special disadvantage of these known machine tools that in the event that a larger number of machining tools need to be provided a respectively high number of tool spindles is necessary which must be additionally arranged on the rack, thus requiring the optional need for larger rack sizes, especially in the case of especially complex machining procedures, which obviously makes the machine tool more expensive.

In order to also enable the machining of two workpieces simultaneously with such known machine tools it is known (DE 10 2004 050 199 A1) to provide a working chamber in which at least two workpiece carriers are arranged. Both workpiece carriers are connected with displacement devices, so that they can be moved at least two-dimensionally in the working chamber. These displacement devices determine displacement areas which lie within the working chamber and can be determined independent from one another. They can be used to perform different machining processes such as grinding, honing, pressing in of bushes or the like in one machine similarly. The disadvantageous aspect is the increased complexity of the machine tool in the event that a considerable number of machining tools need to be provided.

SUMMARY OF THE INVENTION

Based on the state of the art of the kind mentioned initially, the invention is based on the object of providing a machine tool which allows machining a workpiece with an increased number of tools without having to use more complex work stations, this being provided with the shortest possible machining times, i.e. minimized non-productive times.

This object is achieved by the invention in such a way that at least one of the tool spindles is associated with a tool magazine plus tool changer.

This simple and elegant measure offers the possibility of performing machining with an increased number of tools on tool machines with a plurality of fixed tool spindles without having to increase the number of spindles. The workpiece is displaced by the workpiece carrier from machining tool to machining tool. The respective tool can optionally be displaced to its working position already during the approach of the workpiece carrier with the workpiece and is thus directly ready for use. The invention offers the possibility of performing a machining step with the tool spindle associated with the tool magazine plus tool changer, then changing to another fixed tool spindle and performing a further machining step while the tool changer changes the respective tools between the tool magazine and the tool spindles. The workpiece carrier with the workpiece can move towards the tool spindle already during the next working step, which spindle is associated with the tool magazine and the tool changer. An increased number of tools can be used at a reduced number of spindles without increasing the non-productive times of the tool machine.

In order to prevent substantially increasing the construction work for the machine tool it is recommended that the tool magazine is a revolver drum or a chain magazine which together with the rotary drive is fastened to the rack adjacent to the tool spindle. Revolver drums are usually very small and can thus accommodate a respective number of tools in a compact manner without requiring an excessive amount of space. Chain magazines can usually accommodate a plurality of tools in compact configuration and optionally allow equipping the tool magazine from outside of the machine tool.

In order to simplify the transfer of tools between tool magazine and revolver drum it is recommended that the tool changer plus changer drive is fastened to the rack between the tool magazine and the tool spindle. This leads to an especially compact module for the tool changer of the machine tool in accordance with the invention, which tool changer can also be retrofitted easily to existing machine tools without causing any unnecessarily long standstill times of the machine tool.

In order to ensure that the tool machine itself or the tools inserted in the tool magazine do not obstruct the machining process of the workpieces in the machine tool, it is recommended that the tools in the tool magazine are inserted in the magazine with a rotational axis in the respective tool holders which is aligned parallel to the revolver drum axis of a drum magazine or a chain wheel axis of a chain magazine, and the tool holders can be moved from this storage position to a transfer position with an axis which is parallel to the associated tool spindle. It is thus ensured by way of simple construction that in their magazine position the tools do not protrude into the working area of the machine tool, but there is still a simple possibility of a tool change after the swivelling of the respective tool holders from the storage position to a transfer position with an axis which is parallel to the associated tool spindle, i.e. substantially in the direction of a machining space.

From this position, a tool change can be made in an advantageous manner especially with a tool changer which comprises a two-arm lever which comprises grippers for tools on the one side and which can be moved for changing the tool in the direction of an axis that is parallel to the associated tool spindle and is rotatable about said axis. This two-arm lever grips the tool inserted in the tool spindle for example with a gripper, and with the other gripper associated with the lever it grips the tool inserted in the tool holder of the tool magazine. After detaching the tool from the workpiece holder, the two-arm lever is displaced in the direction towards the axis parallel to the spindle axis, which two-arm lever is then rotated by 180° for example, and the tool to be exchanged is inserted simultaneously with the exchanged tool in the tool spindle and the tool holder of the tool magazine, respectively. When the two-arm lever is then detached from the tools and is swivelled to a parking position retracted from the machining space of the machine tool, easy machining of the workpieces is possible without any obstructions.

In order to prevent limiting the number of tool spindles that are possible in a conventional machine tool during the provision of a tool spindle in accordance with the invention plus tool magazine and tool changer, it is recommended that the tool magazine plus tool changer and associated tool spindle are arranged in the lateral region, i.e. in the connecting region of two legs of the frame-like rack. In this case, the tool spindle could be arranged in a position which is unchanged with respect to the state of the art and the tool changer plus magazine would protrude into a region of the lateral connecting leg of the rack which is usually not used by tools.

BRIEF DESCRIPTION OF THE DRAWINGS

The drawings schematically show the invention by reference to an embodiment, wherein.

DESCRIPTION OF THE PREFERRED EMBODIMENT

Figure 1:
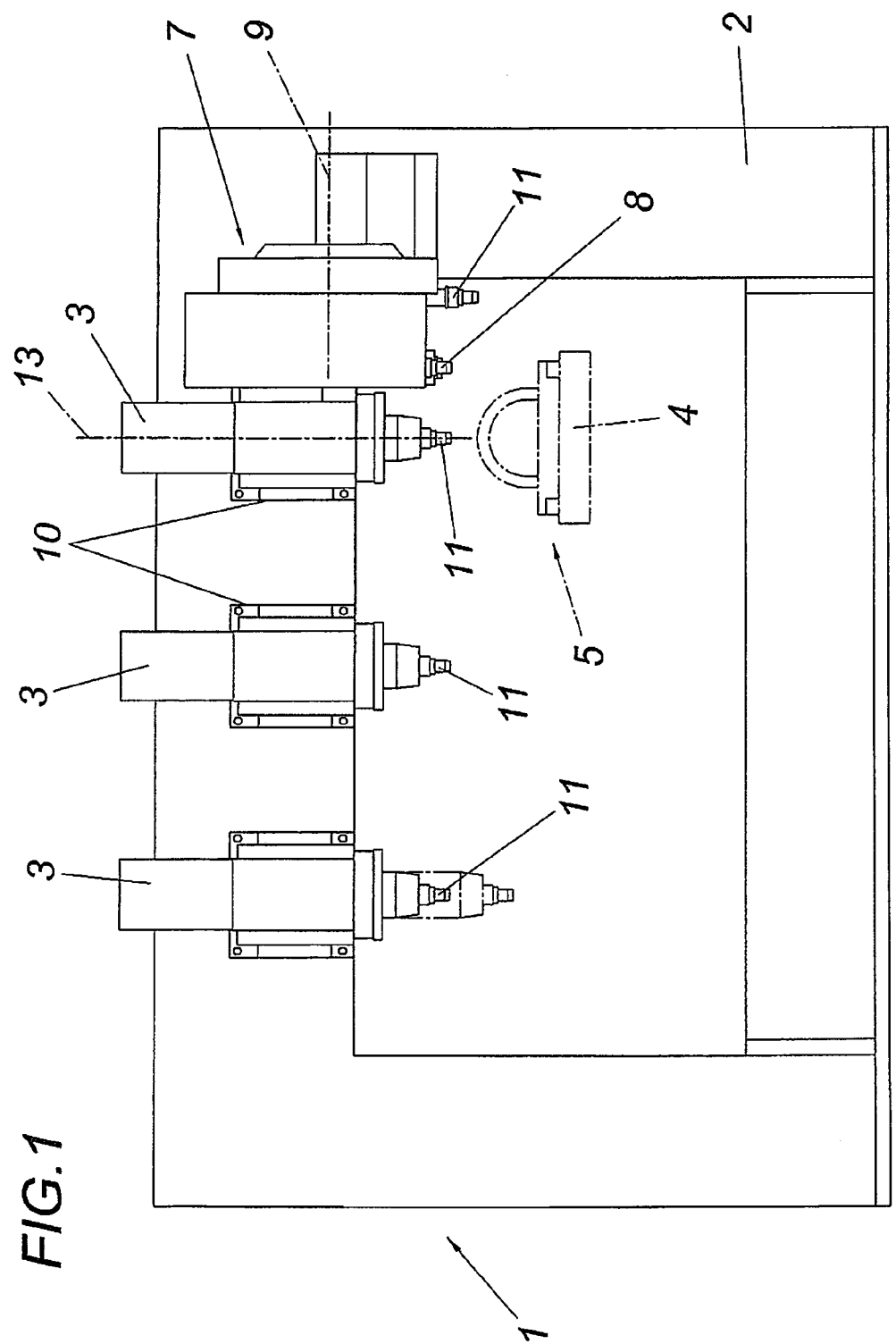
FIG. 1 shows a machine tool in accordance with the invention in a front view.
Figure 2:
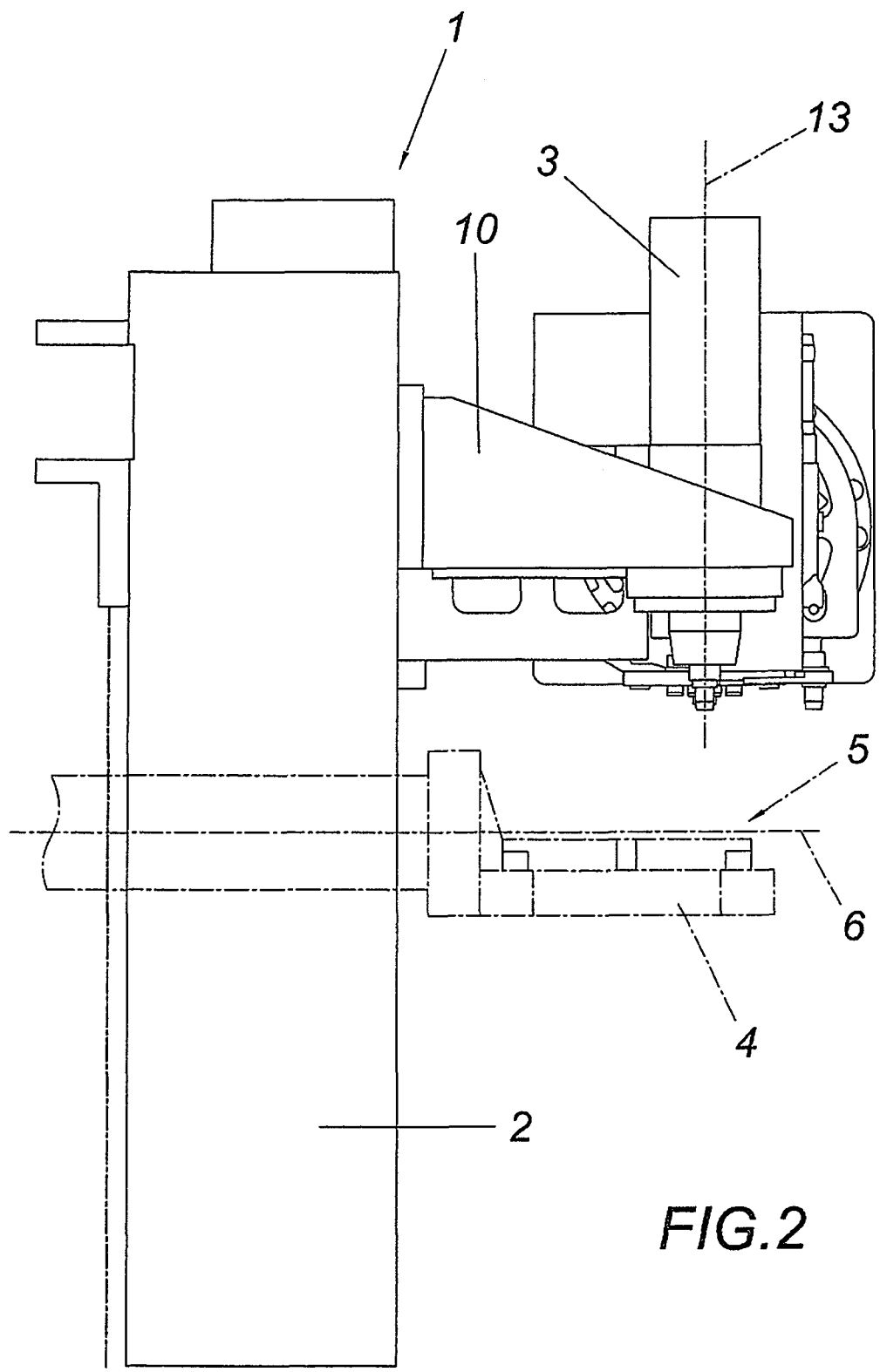
FIG. 2 shows the machine tool of FIG. 1 in a side view.
Figure 3:
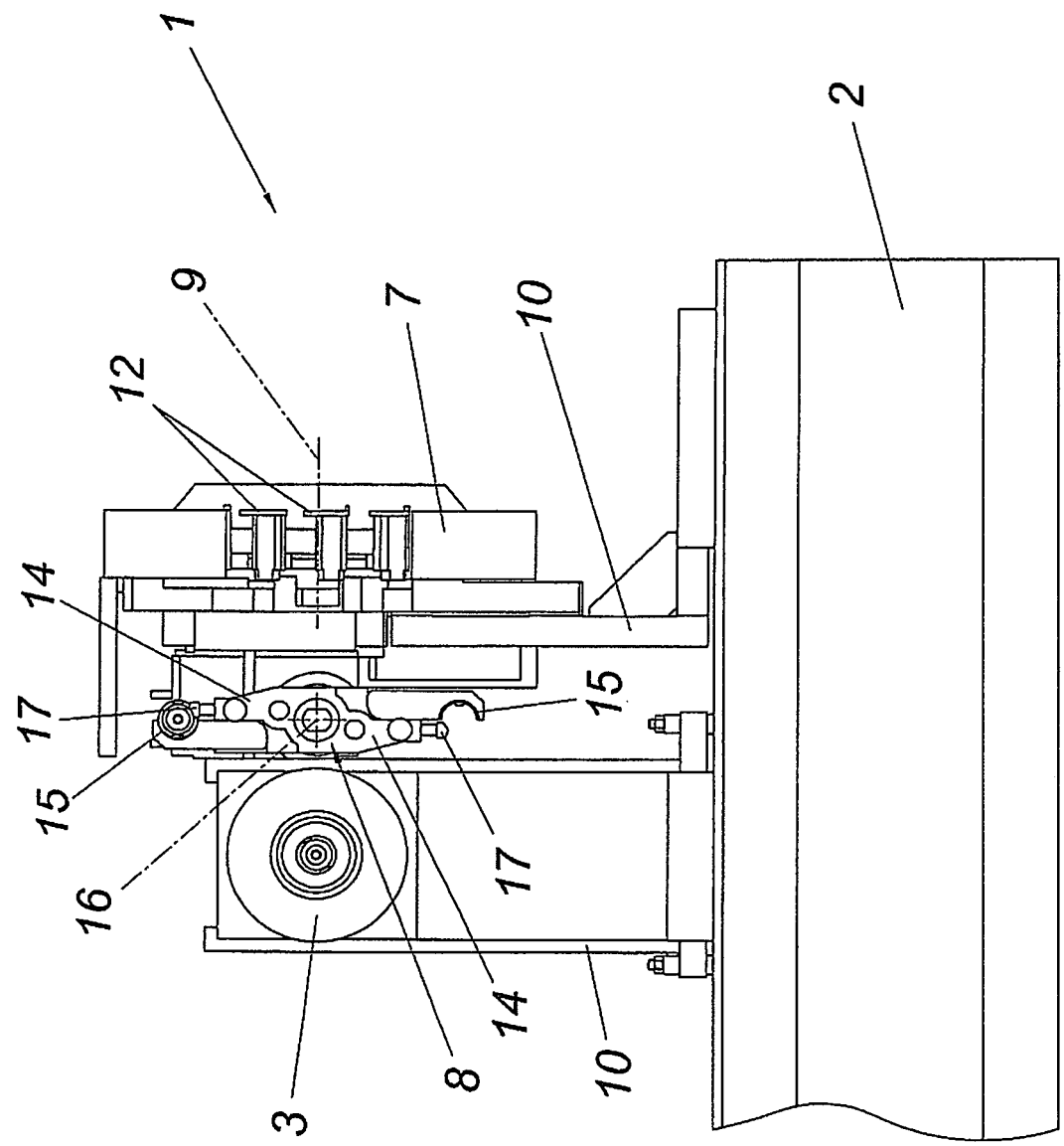
FIG. 3 shows a bottom view of the machine tool of FIGS. 1 and 2 in the region of the spindle with associated tool magazine.

A machine tool 1 in accordance with the invention comprises a plurality of tool spindles 3 which are arranged in a fixed manner in a frame-like rack 2 and positioned in different positions. It is indicated with the dot-dash line in FIG. 1 that that the individual tool spindles are displaceable between a retracted idle position and an extended working position in order to prevent obstructions during the machining of workpieces by other tools. Furthermore, the machine tool 1 comprises a workpiece carrier 4 which comprises a workpiece holder 5. Said workpiece carrier 4 is movable in a translational manner in three axes in the illustrated embodiment, i.e. in the plane of the frame 2, perpendicular to this plane of the frame, and is additionally arranged to be rotatable about axis 6. It is also known from the state of the art to provide workpiece holders 5 which are rotatable relative to the workpiece carrier 4.

It is provided in accordance with the invention that at least one of the tool spindles 3 is associated with a tool magazine 7 plus tool changer 8 and an associated rotary drive for the tool magazine 7.

The tool magazine 7 is a revolver drum fastened to the rack 2 plus a rotary drive (not shown in closer detail) adjacent to the associated tool spindle 3, which drum is rotatably mounted about the axis 9. In the illustrated embodiment, all tool spindles 3 plus the tool magazine 7 and the tool changer 8 are fastened to the rack via respective consoles and intermediate pieces 10, especially screwed together with the same.

The tool changer 8 plus tool changer drive is fastened to the rack between the tool magazine 7 and the tool spindle 3. In this embodiment, the tools 11 in the tool magazine are inserted in respective tool holders 12 with a rotational axis which is aligned parallel to the revolver drum axis 9, with the tool holders 12 being displaceable from this storage position to a transfer position with an axis 13 parallel to the associated tool spindle 3 (see FIG. 1).

The tool changer 8 comprises a two-arm lever 14 which comprises grippers 15 for tools 11 at the end side and which is displaceable for tool changing in the direction of an axis 16 parallel to the associated tool spindle 3 and is also rotatable about said axis 16. The grippers are further associated with tool releasing devices 17, with which the tool, which is inserted via a clamping seat in the respective tool spindle 3 or the tool holder 12, can be released from its fixing. The required revolver drum plus tool is chosen for changing the tool and moved with the rotary drive of the revolver drum to a transfer position, the tool holder 12 is swivelled from the storage position to a transfer position, thereafter gripped by the gripper 15, detached from the respective holder, removed in the direction of axis 16 from the holder, with the grippers thereafter being swivelled 180° about axis 16 and the tools being inserted again in the associated tool spindle 3 or the associated tool holder 12. Thereafter it is merely necessary to swivel the tool holder 12 from the machining area, whereupon the associated tool spindle 3 can be used again.

Figure 4:
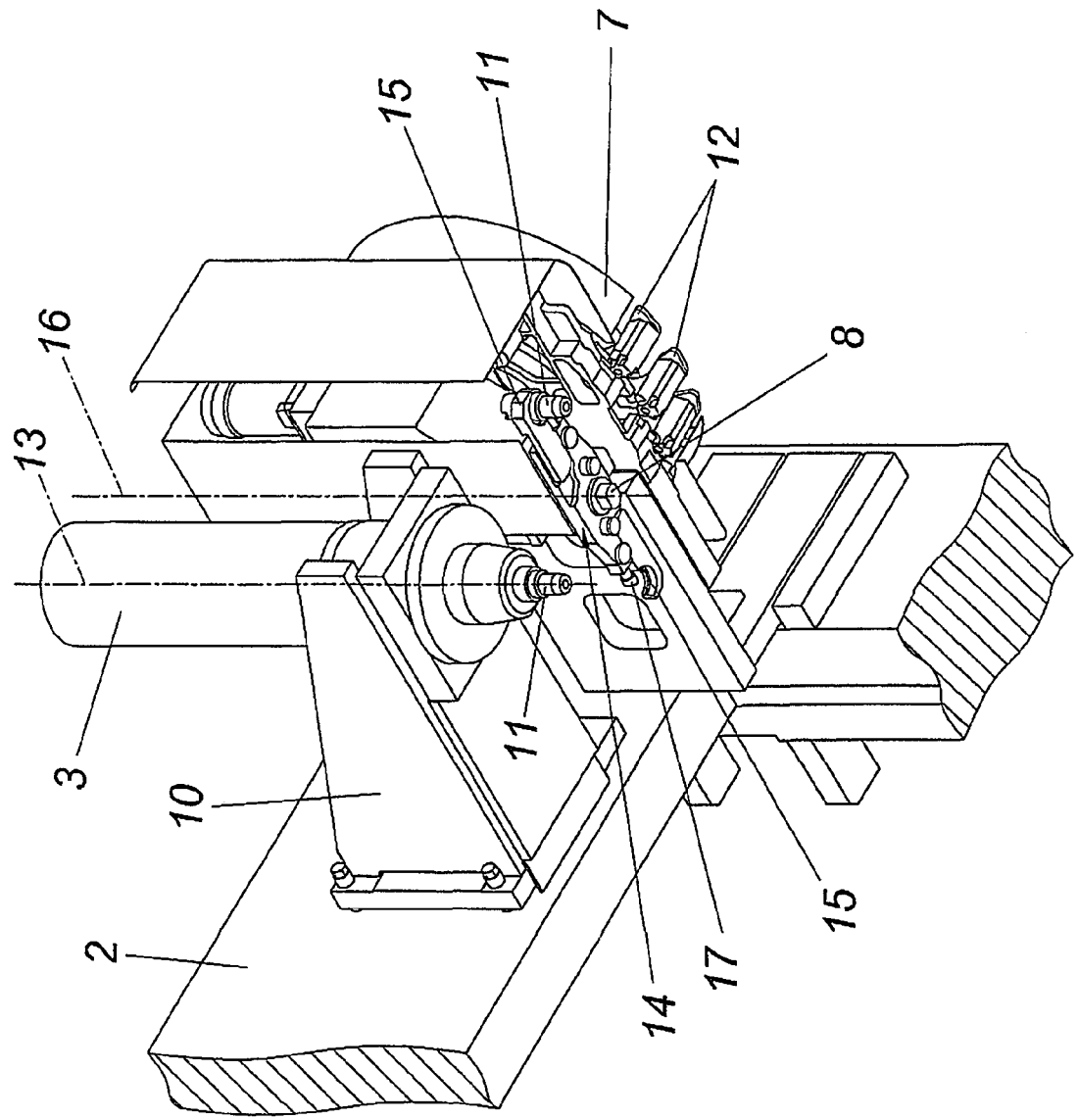
FIG. 4 shows the arrangement of FIG. 3 in a partly sectional oblique view.

FIGS. 1 and 4 show especially that the tool magazine 7 plus tool changer 8 and the associated tool spindle 3 are arranged preferably in the lateral region, i.e. in the connecting region of two legs of the frame-like rack 2, so that existing machine tools can be expanded easily and the use of tool spindles 3 disposed close to one another is not impaired.

The invention claimed is:

1. A machine tool, comprising
a frame-shaped rack,
a plurality of tool spindles positioned at different positions in the frame-shaped rack and each tool spindle having a respective tool,
a workpiece carrier with at least one workpiece holder, with the workpiece carrier being movable in at least two axes in a translational manner, and
a tool magazine having a tool changer,
wherein at least a first tool spindle of the plurality of tool spindles is associated with the tool magazine having the tool changer,
wherein the tool magazine having the tool changer and the first tool spindle are arranged in a lateral region of the frame-shaped rack, wherein the workpiece carrier is capable of displacing the workpiece to the first tool spindle for performance of at least a first working step by the tool of the first tool spindle and from the first spindle for performance of at least a second working step by the tool of a second tool spindle of the plurality of tool spindles, and wherein the workpiece carrier extends through an opening in the frame-shaped rack.

2. The machine tool according to claim 1, wherein the tool magazine is fastened to the rack adjacent to the first tool spindle and comprises a revolver drum.

3. The machine tool according to claim 1, wherein the tool changer has a changer drive and is fastened to the frame-shaped rack between the tool magazine and the first tool spindle.

4. The machine tool according to claim 2, wherein the tool magazine comprises a plurality of tools inserted in respective tool holders of the tool magazine, each tool holder having a rotational axis which is aligned parallel to a revolver drum axis, and each tool holder is movable from a storage position to a transfer position, said transfer position having a transfer position axis parallel to an associated tool spindle.

5. The machine tool according to claim 3, wherein the tool changer comprises a two-arm lever which comprises grippers for tools at an end side of the two-arm lever and wherein said two-arm lever is moveable toward a rotation axis parallel to the first tool spindle and is rotatable about said rotation axis in order to change a tool.

6. The machine tool according to claim 1, wherein the first tool spindle is arranged in a fixed position on the frame-shaped rack.

7. The machine tool according to claim 1, wherein the first tool spindle is displaceable on the frame-shaped rack from a retracted idle position to an extended working position with respect to the frame-shaped rack.

8. The machine tool according to claim 1, wherein the workpiece carrier is also moveable rotationally.

\* \* \* \* \*